United States Patent [19]

Polando

[11] Patent Number: 4,936,161
[45] Date of Patent: Jun. 26, 1990

[54] CABLE LENGTH ADJUSTER WITH PUSH AND LOCK ATTACHMENT

[75] Inventor: Scott A. Polando, Lake Orion, Mich.

[73] Assignee: Vdoyazaki Corporation, Winchester, Va.

[21] Appl. No.: 390,377

[22] Filed: Aug. 7, 1989

[51] Int. Cl.⁵ .............................................. F16C 1/22
[52] U.S. Cl. .................................. 74/502.6; 74/502.4; 74/501.5 R; 188/196 M; 188/176 P; 411/550; 411/462
[58] Field of Search ............ 74/502.4, 502.6, 501.5 R, 74/527, 470; 403/320, 46, 118; 188/196 M, 196 P; 411/550, 551, 402, 403

[56] References Cited

U.S. PATENT DOCUMENTS

| | | | |
|---|---|---|---|
| 1,987,239 | 1/1935 | Lochrane | 403/118 |
| 3,542,980 | 11/1989 | Hamilton | 287/20 |
| 3,572,159 | 3/1971 | Tschanz | 74/501 |
| 3,572,160 | 3/1971 | Stahr | 74/501 |
| 3,662,617 | 5/1972 | Bennett et al. | 74/501 R |
| 3,710,645 | 1/1973 | Bennett | 74/501 P |
| 3,885,767 | 5/1975 | Olowinski et al. | 248/204 |
| 3,930,428 | 1/1976 | Hale | 411/402 |
| 4,175,450 | 11/1979 | Bennett | 74/501 P |
| 4,177,691 | 12/1979 | Fillmore | 74/501 P |
| 4,218,935 | 8/1980 | Ion et al. | 74/501 R |
| 4,242,932 | 6/1981 | Barmore | 411/410 |
| 4,325,904 | 4/1982 | Frankhouse | 264/242 |
| 4,331,041 | 5/1982 | Bennett | 74/501.5 R |
| 4,333,361 | 6/1982 | Spease | 74/501 P |
| 4,458,552 | 7/1984 | Spease et al. | 74/501 R |
| 4,547,239 | 10/1985 | Carlson | 156/73.5 |
| 4,676,119 | 6/1987 | Spease | 74/501 R |
| 4,753,123 | 6/1988 | Stormont | 74/500.5 |
| 4,763,541 | 8/1988 | Spease | 74/501 R |
| 4,799,400 | 1/1989 | Pickell | 74/502.6 |
| 4,833,937 | 5/1989 | Nagano | 74/502.4 |

FOREIGN PATENT DOCUMENTS

| | | | |
|---|---|---|---|
| 0267685 | 9/1987 | European Pat. Off. | 74/501.5 R |
| 2261933 | 12/1872 | Fed. Rep. of Germany | 285/325 |
| 0525787 | 5/1931 | Fed. Rep. of Germany | 74/502.4 |

OTHER PUBLICATIONS

Drawing No. 15C9801, Connector-Body to Bracket, Jan. 17, 1989.

Primary Examiner—Leslie A. Braun
Assistant Examiner—Winnie Yo
Attorney, Agent, or Firm—Basile and Hanlon

[57] ABSTRACT

A cable length adjuster with push and lock attachment for attaching and adjusting the length of a cable with respect to a support member. The cable length adjuster includes a stud having an externally threaded end portion and an intermediate boss formed with a polygonal-shaped exterior surface having a plurality of flat faces. A sleeve has a complimentarily shaped, polygonal cross section bore and is non-rotatably engageable with the boss on the stud. A nut is threadingly connected to the threads on the stud. The nut has a polygonal exterior shape to slidingly and non-rotatably support the sleeve. A spring is mounted between the nut and the sleeve to bias the sleeve into engagement with the boss on the stud. The cable is connected to the nut. Retraction of the sleeve from engagement with the boss on the stud enables the sleeve and the nut to be rotated thereby varying the overall length of the nut and stud through the threaded engagement of the nut with the stud. The first end of the stud is attachable to the support member. In another embodiment, a retainer is inserted within the sleeve and engages the sleeve in a snap fit. Lock fingers formed on the retainer engage recesses formed in the second end of the nut to limit the travel of the nut in a first direction to prevent disengagement of the nut from the stud.

20 Claims, 5 Drawing Sheets

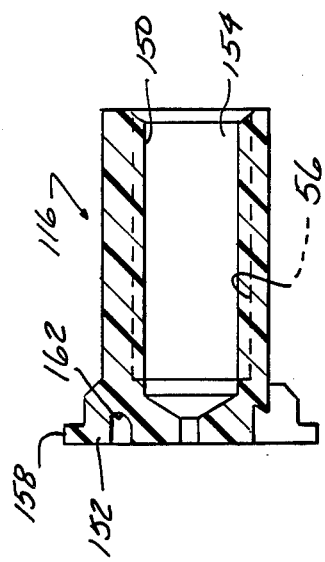
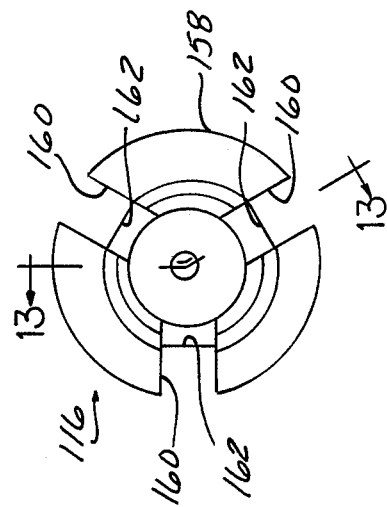
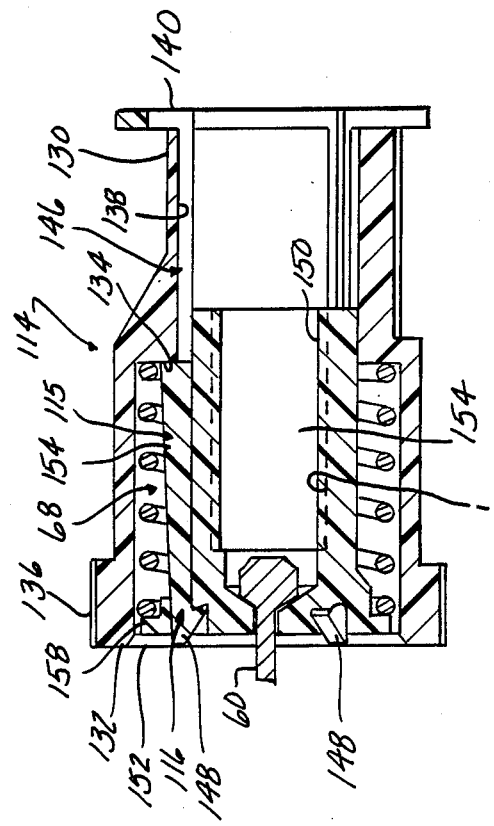
FIG-13
FIG-14
FIG-12

CABLE LENGTH ADJUSTER WITH PUSH AND LOCK ATTACHMENT

BACKGROUND OF THE INVENTION

Field of the Invention

This invention relates, in general, to connectors and, specifically, to connectors for attaching a cable or other motion transmitting member to a support and, more specifically, to cable length adjusters for adjusting the length of a cable or other motion transmitting member relative to a support.

Various connectors have been devised to releasably connect one member to another. Connectors have also been employed to releasably connect a motion transmitting member, such as a flexible cable, to a support member to transmit motion from the cable to the support.

Due to manufacturing tolerances and variations in the shape, dimensions and relative position of parts in a manufactured assembly, it is frequently necessary to adjust the position of one element or part with respect to another when assembling the parts. Thus, adjustable connectors have been devised which enable the position of one element with respect to another, typically fixed element to be varied as needed during assembly or use.

However, in certain assembly operations, working space is at a minimum and it is difficult for a worker to employ both hands to adjust the position of one element of a connector with respect to another element. Further, the actual position of the connector may be hidden from view of the worker thereby making adjustments in the connector difficult.

Thus, it would be desirable to provide an adjustable connector for attaching one element to another in which the position of one element can be easily adjusted. It would also be desirable to provide an adjustable connector in which positional adjustments may be made by only using one hand.

SUMMARY OF THE INVENTION

The present invention is a cable length adjuster with push and lock attachment for use in attaching a cable or other motion transmitting member to a support member.

The cable length adjuster comprises a stud having first and second ends. Means are provided for attaching the first end of the stud to the support member. A sleeve is provided in the cable length adjuster which has first and second ends. Means are formed on the stud and the sleeve for non-rotatable engaging the first end of the sleeve with the stud. Biasing means mounted between the nut and the sleeve biases the sleeve toward the first end of the stud. A nut having first and second ends slidably and non-rotatably supports the sleeve. Means are provided for extensibly connecting the nut to the stud to enable the overall length of the connected nut and stud to be adjustably varied. Finally, means are provided for connecting the cable or other element to the second end of the nut.

In a preferred embodiment, threads are formed on the stud and the nut for extensibly connecting the nut to the stud and to enable the overall length of the nut and the stud to be varied.

A boss with a polygonal exterior comprised of a plurality of circumferential, angularly disposed flat faces is formed on the stud and is releasably engagable with a corresponding polygonal cross section bore formed in the first end of the sleeve for non-rotatably engaging the sleeve with the stud. The nut also has a polygonal-shaped exterior to slidingly and non-rotatably support the sleeve such that the sleeve is free to move axially along the length of the nut.

The biasing means preferably comprises a coil spring mounted between seats formed on the nut and the sleeve. The coil spring biases the sleeve toward the first end of the stud into engagement with the boss on the stud.

The cable or other element attached to the second end of the nut may take many forms. In one embodiment, the cable comprises a flexible cable having an enlarged ball formed at one end. The ball is mounted in the nut such that the cable extends through a bore formed in the second end of the nut. The end of the cable and, thereby, the overall length of the cable may be adjusted upon movement of the nut relative to the stud.

When the first end of the sleeve is engaged with the polygonal-shaped boss on the stud under the bias of the coil spring, the sleeve and the nut non-rotatably joined thereto are prevented from rotating with respect to the stud. However, a retractive force exerted on the sleeve urging the sleeve away from engagement with the boss on the stud such that the sleeve slides axially along the nut enables the sleeve and the nut to be rotated to threadingly move the nut along the length of the stud to thereby vary the overall length of the connected nut and stud and thereby the length of the cable attached to the nut relative to the support member attached to the stud. Release of the sleeve will cause the sleeve to move under the bias of the spring into engagement with the polygonal-shaped boss on the stud to retain the cable length adjuster in the desired fixed dimensional position.

According to the present invention, the means for attaching the stud to the support member comprises a push and lock attachment member which is releasable connectable to the first end of the stud. A projection is joined to and extends outward from the first end of the stud. In a preferred embodiment, the projection has a cylindrical shape and is joined to the first end of the stud by a thin integral rib.

The attachment member comprises a body having first and second spaced legs interconnected at one end by a central end portion. A recess is formed in the exterior peripheral edges of the first and second legs and the central end portion to slidably engage the edges of a substantially U-shaped slot formed in the support member. An open-ended slot is formed in the attachment member between the first and second legs. The slot has a cross section complementary to the shape of the projection joined to the first end of the stud such that the projection attached to the stud is slidable insertable into the slot to attach the stud to the attachment member. In this position, the stud and the cable length adjuster is free to pivotally move with respect to the attachment member in a plane perpendicular to the axial extent of the slot in the attachment member.

An arm is joined to and extends outward from and parallel to one of the first and second legs of the attachment member. A projection is formed on the arm and lockingly engages a bore formed in the support member to prevent the attachment member from sliding out from the support member.

In another embodiment, the cable length adjuster is provided with means for retaining the stud and nut in engagement. The retaining means comprises a retainer attached in a snap fit to the sleeve and having first and second ends. The first end has a planar shape. A plurality of resilient, axially extending, circumferentially-spaced prongs are joined to the first end of the retainer and extend to the second end of the retainer. An enlarged lock finger is formed at the end of each of the prongs and lockingly engages the second end of the nut, after the nut is inserted into the retainer, to limit the travel of the nut in one direction with respect to the retainer.

Preferably, three equi-circumferentially-spaced prongs are employed in the retainer. A plurality of axially extending, circumferentially-spaced grooves are formed in the bore of the sleeve to slidingly receive the prongs of the retainer. An internal shoulder is formed in the sleeve intermediate the first and second ends of the sleeve. An outwardly inclined rib is formed on each prong of the retainer extending from the second end of the retainer to an intermediate portion of the retainer. Each rib terminates in a face which is engageable with the shoulder in the sleeve to connect the retainer to the sleeve in a snap-fit connection. The first end of the retainer engages the first end of the sleeve when the faces of the ribs of the retainer engage the shoulder of the sleeve.

A plurality of circumferentially-spaced slots are formed in the second end of the nut. A recess is formed in each end of each slot. The lock finger of each prong of the retainer slides through a slot in the nut and engages the recess in the nut to limit the travel of the nut in a first direction with respect to the retainer. A plurality of lock fingers are also formed on the first end of the stud. The lock fingers surround the planar first end of the retainer when the stud is slidably inserted into the retainer and engaged with the nut to limit travel of the first end of the retainer in one direction with respect to the stud.

The present cable length adjuster with push and lock attachment enables a cable or other element to be adjusted in length with respect to a support member in a simple, inexpensive and reliable manner. The adjuster can be easily adjusted by a worker using only one hand. In particular, the cable length adjuster of the present invention finds advantageous use in manufacturing operations where assembly space is limited or the actual mounting position of the cable length adjuster is hidden from direct view of the worker.

BRIEF DESCRIPTION OF THE DRAWING

The various features, advantages and other uses of the present invention will become more apparent by referring to the following detailed description and drawing in which:

FIG. 12 is a left end view of the nut shown in FIG. 8;

FIG. 13 is a cross sectional view of the nut, generally taken along line 13—13 in FIG. 12; and FIG. 14 is a cross sectional view, generally similar to FIG. 8, but showing the preassembly of the nut, sleeve and retainer of the cable length adjuster shown in FIG. 8.

DESCRIPTION OF THE PREFERRED EMBODIMENTS

Figure 1:
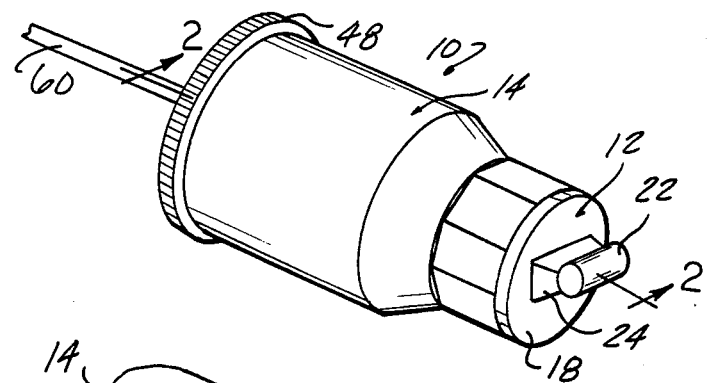
FIG. 1 is a perspective view of the cable length adjuster of the present invention.

Throughout the following description and drawing, an identical reference number is used to refer to the same component shown in multiple figures of the drawing.

Referring now to the drawing, and to FIG. 1 in particular, there is illustrated one embodiment of a cable length adjuster for attaching a cable to a support member which enables the length of the cable to be adjusted with respect to the support member.

It will be understood that throughout the following description, the cable length adjuster of the present invention is defined as connecting a cable to a support member. The term "cable" is used for illustrative purposes only and covers any type of member, such as a rigid member, a telescopingly extendable member or a flexible cable which has its overall length adjusted with respect to a support member.

Figure 2:
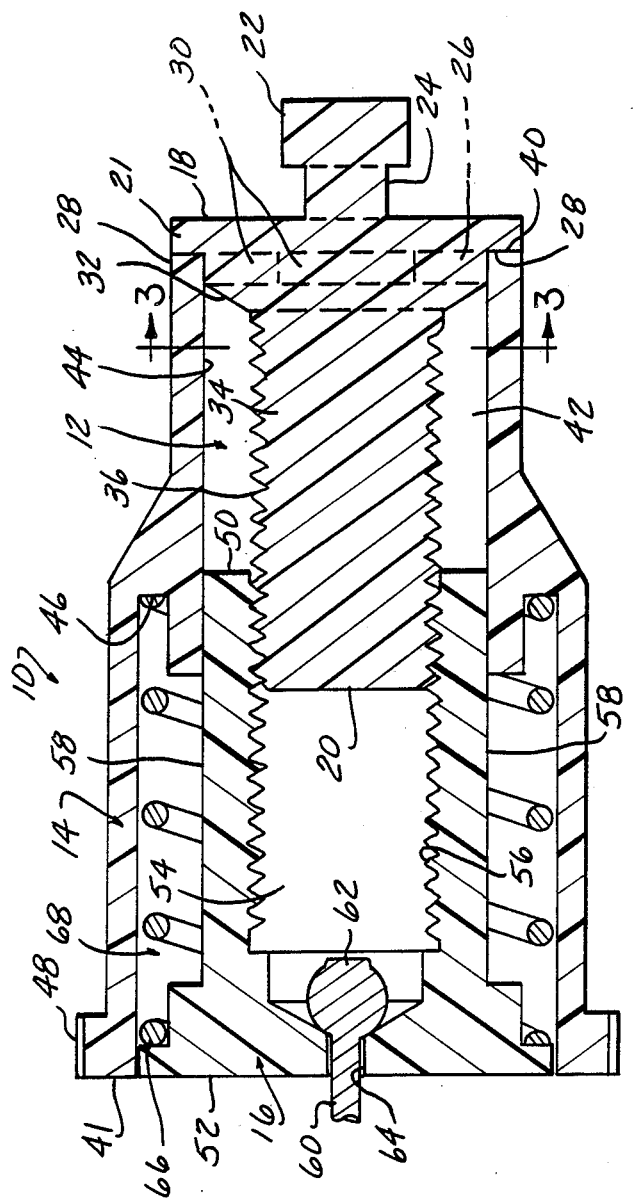
FIG. 2 is a cross sectional view of the cable length adjuster generally taken along line 2—2 in FIG. 1 and showing the components of the cable length adjuster in a locked, fixed dimensional position.

As shown in FIGS. 1 and 2, the cable length adjuster 10 of the present invention is formed of a multi-part assembly comprising a stud 12, a sleeve 14 and a nut 16. The stud 12, sleeve 14 and nut 16 may be formed of any suitable material depending upon the needs of a particular application. For example, each of these elements may be formed of plastic material which is molded or machined to the desired shape. Alternately, some or all of these components may be formed of metal. For example, the stud 12 may be formed of a die cast metal for additional strength.

As shown more clearly in FIG. 2, the stud 12 has a first end 18 and a second end 20. The first end 18 has a thin planar disk shape 21. A cylindrically-shaped projection 22 is joined to and extends outward from the first end 18 of the disk-shaped end portion 21 by a rib 24 integrally joined to the projection 22 and the disk-shaped end portion 21. The projection 22 provides connection to a support member, as described in greater detail hereafter.

A boss 26 is integrally joined to and extends from the disk-shaped end portion 21 as shown in FIG. 2. The boss 26 has a diameter less than the diameter of the disk-shaped end portion 21 such that the peripheral edges 28 of the disk-shaped end portion 21 extend outward beyond the peripheral extent of the boss 26 and form a seat for receiving one end of the sleeve 14.

Figure 3:
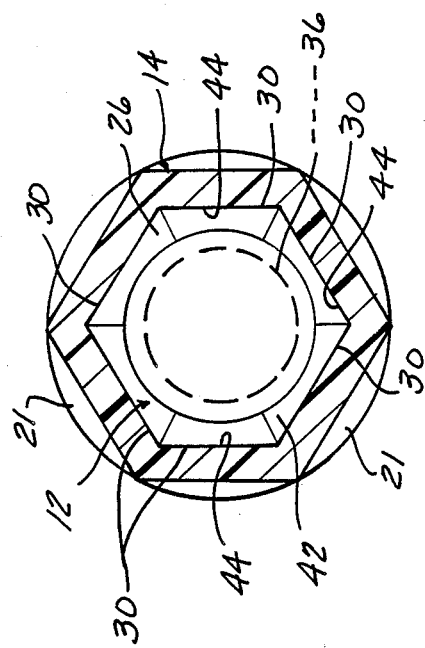
FIG. 3 is a cross sectional view generally taken along line 3—3 in FIG. 2.

The boss 26 forms a part of a means for non-rotatably engaging the first end of the sleeve 14 to the stud 12. This means also comprises a polygonal exterior surface formed on the boss 26. The polygonal surface is formed of a plurality of circumferentially end-to-end connected, angularly disposed flat faces 30 as shown in FIGS. 2 and 3. Preferably, the polygonal shape comprises a hexagon thereby having six flat faces 30.

An angularly disposed, tapered surface 32 is formed on the stud 12 and extends from the peripheral edge of the boss 26 to a reduced diameter portion 34 of the stud 12. The inclined surface 32 acts as a guide to ensure secure engagement of the sleeve 14 with the boss 26, as described in greater detail hereafter.

The reduced diameter portion 34 of the stud 12 forms a part of a means for extensibly connecting the nut 16 to the stud 12. In a preferred embodiment, thread means are formed on the second portion 34 of the stud 12. The thread means comprise a plurality of external threads 36 which extend along the length of the reduced diameter portion 34 of the stud 12 to the second end 20 as shown in FIG. 2. In a preferred embodiment, the threads 36 have a large pitch so that only a few revolutions of the nut 16, as described hereafter, are required to move the nut 16 a considerable distance along the length of the stud 12.

The sleeve 14 is in the form of a hollow, tubular member having a first end 40 and a second end 41. The portion of the sleeve 14 adjacent the first end 40 is provided with means for non-rotatably engaging the stud 12. In a preferred embodiment, a bore 42 formed adjacent the first end 40 of the sleeve 14 has a polygonal cross section formed of a plurality of circumferential, angularly disposed flat faces 44. The polygonal shape of the bore 42 is complimentary to the polygonal shape of the boss 26 on the stud 12 so as to provide a secure, non-rotatable fit between the mating flat faces 44 of the bore 42 in the sleeve 14 and the flat faces 30 of the boss 26 of the nut 16 when the first end 40 of the sleeve 14 is engages with the boss 26 on the nut 16. This is clearly illustrated in FIG. 3 in which the bore 42 of the sleeve 14 is provided with a hexagonal cross section formed of six flat faces 44. The exterior surface of the sleeve 14 may have any desired cross section, such as circular, polygonal, etc., although a hexagonal shape is illustrated in FIG. 3.

A notch 46 is formed in the sleeve 14 intermediate the first and second ends 40 and 41. The notch 46 acts as a seat for a biasing means or spring, as described hereafter. In a preferred embodiment, the exterior surface of the sleeve 14 extends continuously between the first and second ends 40 and 41. However, the exterior surface of the sleeve 14 may be terminated adjacent the notch 46 so as to leave the biasing means or spring seated in the notch 46 exposed.

The second end 41 of the sleeve 14 has an enlarged diameter, as shown in FIG. 2. The peripheral surface 48 of the enlarged diameter second end 41 is provided with suitable gripping means, such as a knurled surface, so as to enable easy rotation of the sleeve 14. Alternately, the exterior surface of the sleeve 14 adjacent the second end 41 may be provided with flat faces to serve as suitable gripping surfaces.

As shown in FIG. 2, the nut 16 is provided with a first end 50 and a second end 52. A hollow bore 54 is formed in the nut 16 and extends inwardly from the first end 50.

Means are formed in the bore 54 for extensibly connecting the nut 16 to the stud 12. Preferably, a plurality of internal threads 56 are formed in the bore 54. The threads 56 have a pitch corresponding to the pitch of the threads 36 on the stud 12 to provide threading and extensible connection of the nut 16 to the stud 12.

Means are provided on the exterior surface of the nut 16 to non-rotatably connect the nut 16 to the sleeve 14. In a preferred embodiment, the exterior surface 58 of the nut 16 is formed with a polygonal cross section complementary to the polygonal cross section of the bore 42 in the sleeve 14. The polygonal flat faces on the exterior surface 58 of the nut 16 slidingly support the polygonal faces 44 in the bore 42 of the sleeve 14 to enable the sleeve 14 to be slid axially along the length of the nut 16. However, the flat faces of the nut 16 and the sleeve 14 prevent rotation of the sleeve 14 with respect to the nut 16; but, enable the sleeve 14 and the nut 16 to be rotated together as a unit, as described hereafter.

The second end 52 of the nut 16 includes means for connecting a cable 60 to the nut 16. As noted above, the cable 60 may comprise any type of member, such as a motion transmitting member. By way of example only, the cable 16 is illustrated as being a flexible cable having an enlarged diameter ball or slug 62 integrally joined at one end. A bore 64 is formed in the second end 52 of the nut 16 and opens to the internal bore 54. The cable 60 may be passed through the bore 64 until the ball 62 engages the solid portion of the second end 52 of the nut 16 surrounding the internal end of the bore 64 to securely attach the cable 60 to the nut 16. Alternately, a radially extending slot may be formed in the second end 52 of the nut 16 which extends radially outward from the bore 62 to the outer peripheral edge of the nut 16. This enables the cable 62 to be slidingly inserted through the radial slot into the bore 64 to trap the ball 62 internally within the nut 16.

It will be understood that the cable 60 may be connected to the nut 16 by any suitable means, such as a rigid, fixed connection externally on the second end 52 of the nut 16.

As shown in FIG. 2, the peripheral edge of the second end 52 of the nut 16 is formed with a notch 66 which forms a seat for a biasing means 68. The biasing means 68 preferably comprises a coil spring which is co-axially disposed about the nut 16 and seats at opposite ends in the notch 66 in the nut 16 and the notch 46 in the sleeve 14. The biasing means 68 biases the sleeve 14 toward the stud 12, or to the right in the orientation shown in FIG. 2, so as to bring the first end 40 of the sleeve 14 into engagement with the boss 26 on the stud 14 and prevent rotation of the sleeve 14 with respect to the stud 12.

In assembling the cable length adjuster 10 of the present invention, the cable 60 is first inserted into the nut 16 before the nut 16 and the sleeve 14 are joined to the stud 12. The projection 22 on the stud 12 may then be joined to a support member 70, FIG. 5, to attach the cable length adjuster 10 and the cable 60 to the support member 70. In the fixed dimensional position of the components of the cable length adjuster 10 shown in FIG. 2, the biasing mean 68 urges the sleeve 14 into engagement with the boss 26 on the stud 12 such that the polygonal faces 44 in the sleeve 14 mate with the complimentary-shaped polygonal faces 30 on the boss 26. In this position, the first end 40 of the sleeve 14 engages the peripheral edge 28 of the disk-shaped end portion 21 of the stud 12.

This engagement between the sleeve 14 and the stud 12 secures the cable length adjuster 10 in a fixed dimensional position. Further, as shown in FIG. 2, the threading engagement of the nut 16 to the stud 12 is illustrated as being at approximately the maximum extension of the nut 16 with respect to the sleeve 12. In this position, the end of the cable 60 is spaced a maximum distance from the support member 70 attached to the projection 22 on the stud 12.

Figure 4:
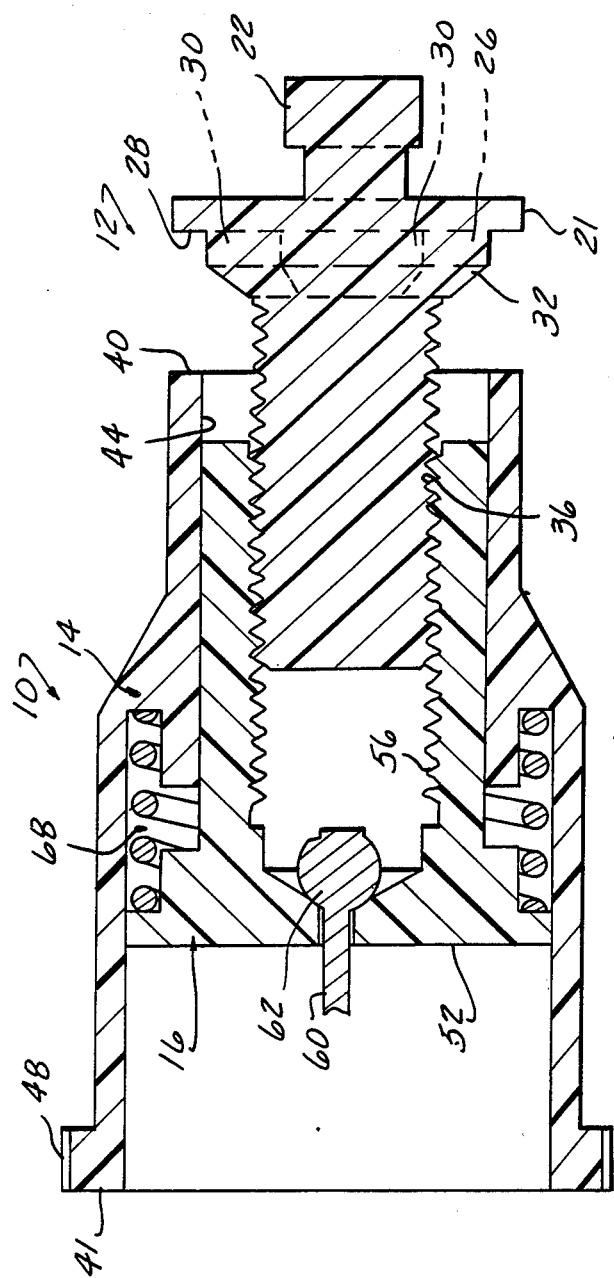
FIG. 4 is a cross sectional view, similar to FIG. 2, but showing the components of the cable length adjuster in a position allowing extension or retraction of the nut with respect to the stud.

When it is necessary to change the spacing between the end of the cable 60 and the support member 70, a retractive force is exerted on the sleeve 14 pulling or retracting the sleeve 14 away from the nut 12 which is securely attached to the support member 70 or to the left in the orientation illustrated in FIG. 4. This retractive force may be applied by a worker grasping the edges 48 of the second end 41 of the sleeve 14 and pulling to the left in the orientation shown in FIG. 4 to overcome the bias of the coil spring 68.

The sleeve 14 is retracted a sufficient distance to disengage the first end 40 of the sleeve 14 from the boss 26. During such retraction, the sleeve 14 slides along the exterior surface 58 of the nut 16 in a non-rotatable manner. When the sleeve reaches the position shown in FIG. 4, a clockwise or counterclockwise rotational movement may be imparted to the sleeve 14 thereby rotating the sleeve 14 and the mated nut 16 in a clockwise or counterclockwise direction.

A clockwise rotation will cause the nut 16 to further threadingly engage the threads 36 on the stud 12 thereby decreasing the overall length of the combined stud 12 and nut 16, such as that shown by way of example in FIG. 4. This distance may be decreased until substantially all of the threads 56 on the nut 16 engage the threads 36 on the stud 12. Of course, rotation of the nut 16 may be stopped at any position so as to adjust the length of the cable 60 as needed for a particular application. Alternately, a counterclockwise rotation imparted to the sleeve 14 and the nut 16 will cause the nut 16 to extend away from the stud 12 to a maximum extension, as substantially shown in FIG. 2.

When the desired position is reached, the sleeve 14 is released such that the biasing spring 68 urges the sleeve 14 toward planar disk-shaped end portion 21 of the stud 12 until the polygonal faces 44 in the bore 42 of the sleeve 14 engage the complimentarily shaped faces 30 on the boss 26 of the stud 12. During this extension of the sleeve 14 relative to the nut 16, the tapered surface 32 formed adjacent to the boss 26 on the stud 12 acts as a guide to seat the sleeve 14 fully on the boss 26. If any misalignment of the sleeve 14 with respect to the stud 12 occurs such that the polygonal faces of the sleeve 14 are not in full engagement with the polygonal faces 30 of the boss 26, any vibration or twisting movement imparted to the sleeve 14 will cause a slight rotation of the sleeve 14 sufficient to move the sleeve 14 into full engagement with the boss 26 under the bias of the spring 68.

Figure 5:
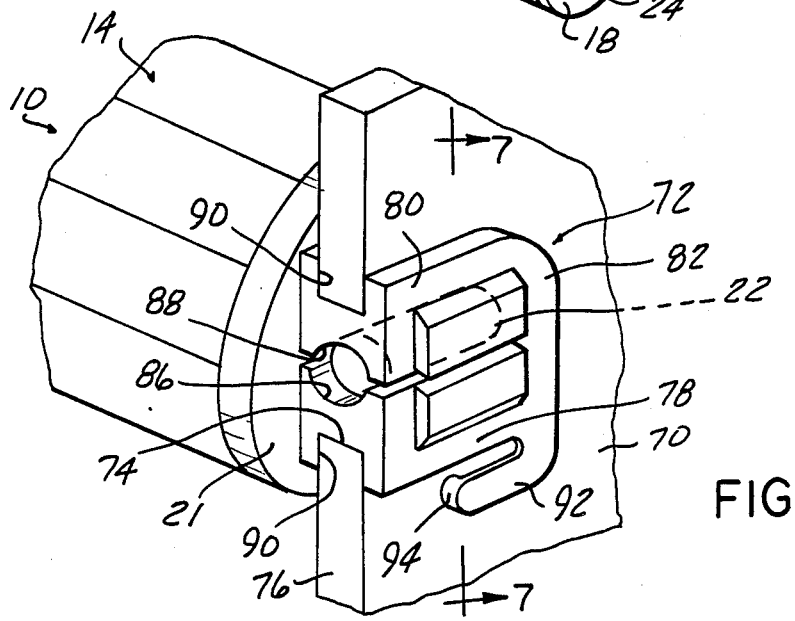
FIG. 5 is a perspective view of the cable length adjuster with push and lock attachment shown mounted on a support member.
Figure 6:
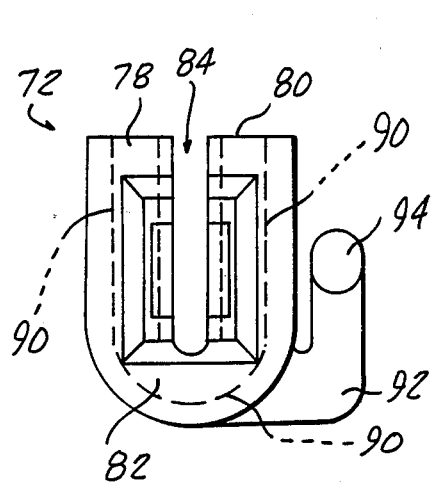
FIG. 6 is a front elevational view of the push and lock attachment shown in FIG. 7.
Figure 7:
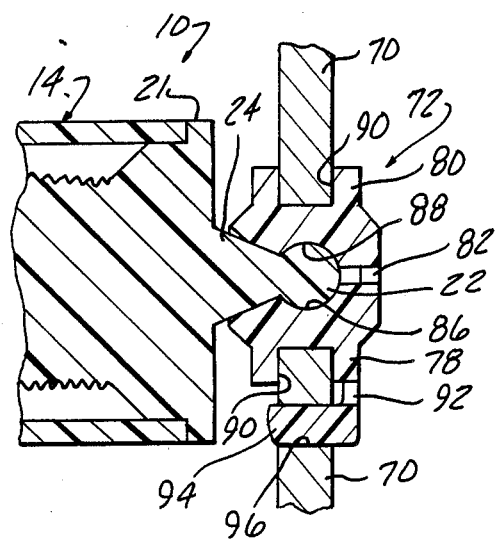
FIG. 7 is a cross sectional view generally taken along line 7—7 in FIG. 5.

By way of example only, the means for attaching the first end of the cable length adjuster 10 to the support member 70 comprises a push and lock attachment means or member 72 shown in FIGS. 5, 6 and 7. The push and lock attachment means 72 is adapted to be slidingly inserted into a substantially U-shaped slot 74 formed in the support member 70. The support member 70 may take any form, such as a planar metal plate, etc. The slot 74 opens from one end of the support member 70 and extends inward a short, predetermined distance from the edge 76 of the support member 70 as shown in FIG. 5.

The push and lock attachment member 72 comprises a single-piece body having first and second spaced legs 78 and 80, respectively, which are joined at one end by an integral, central end portion 82. An open-ended slot 84 is formed between the spaced first and second legs 78 and 80. Recesses 86 and 88 are formed in the facing surfaces of the first and second legs 78 and 80, respectively, and cooperate with the slot 84 to form a cross section complimentarily to the exterior shape of the projection 22 joined to and extending outward from the first end of the stud 12 of the cable length adjuster 10. The slot 84 slidably receives the projection 22 in a snap fit to securely attach the cable length adjuster 10 to the support member 70.

A substantially U-shaped notch 90 is formed in the peripheral edge of the push and lock attachment member 72 and extends continuously about the peripheral surface of the first leg 78, the second leg 80 and the central end portion 82 of the push and lock attachment member 72. The recess 90 engages the edges of the support member 70 bounding the U-shaped slot 74 to prevent twisting or rotational movement or backing out of the push and lock attachment member 72 relative to the support member 70. However, due to the circular cross section of the projection 22 on the cable length adjuster 10, the cable length adjuster 10 is free to pivot within the slot 84 in the push and lock attachment member 72 in a plane perpendicular to the axial extent of the slot 84.

Means are provided for locking the push and lock attachment member 72 to the support member 70. Preferably, the locking means comprises an arm 92 which is integrally formed with the central end portion 82 of the attachment member 72 and extends outward from and then parallel to one of the legs, such as the leg 80. An outwardly extending projection 94 is formed on the arm 92, preferably at the end of the arm 92. The projection 94 lockingly engages a bore 96 formed in the support member 70 adjacent the U-shaped slot 74 to lock the attachment member 72 in a fixed position with respect to the support member 70 to prevent any twisting or rotational movement thereof.

Another embodiment of the cable length adjuster of the present invention is shown in FIGS. 8–14. In this embodiment, the cable length adjuster 110 is configured to prevent the complete unthreading or disengagement of the nut from the stud after their initial assembly.

Figure 8:
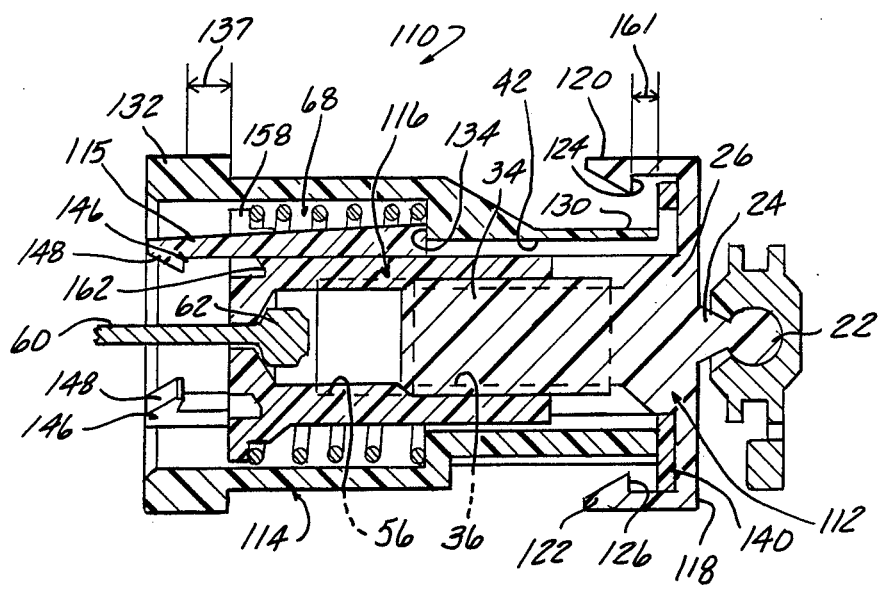
FIG. 8 is a cross sectional view of another embodiment of the cable length adjuster of the present invention.

Referring to FIG. 8, the same components in the cable length adjuster 10 as those described in the cable length adjuster 10 are referred to by the same reference numbers. The cable length adjuster 110 includes a stud 112, a sleeve 114, a retainer 115 and a nut 116.

The stud 112 has substantially the same configuration as the stud 12 described above and includes a planar first end 118. A cylindrical projection 22 is joined to the planar first end 118 by a rib 24 and extends outward therefrom. A boss 26 having a polygonal exterior shape is formed on the stud 112, adjacent the planar first end 118. A reduced diameter portion 34 extends from the boss 26 and is provided with a plurality of external threads.

A plurality of lock fingers, such as lock fingers 120 and 122, are integrally formed with the planar first end portion 118 of the stud 112 and extend substantially perpendicular thereto in a direction facing the sleeve 14. Each of the lock fingers 120 and 122 has an enlarged head portion formed with a notch 124 and 126, respectively, which faces the first end portion 118 and is spaced therefrom. In a preferred embodiment, two lock fingers 120 and 122, spaced 180° apart, are formed on the stud 112.

Figure 9:
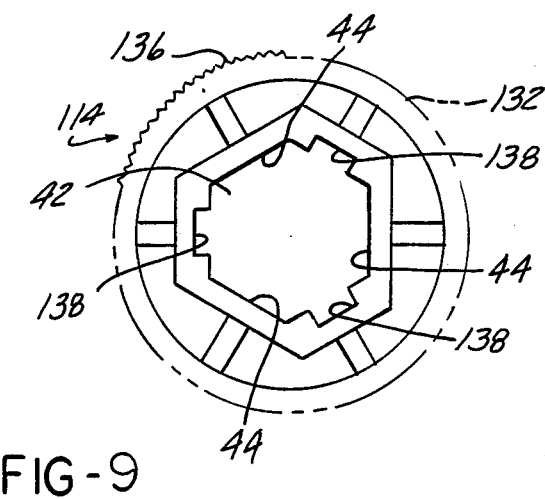
FIG. 9 is a right end view of the sleeve of the cable length adjuster shown in FIG. 8.
Figure 10:
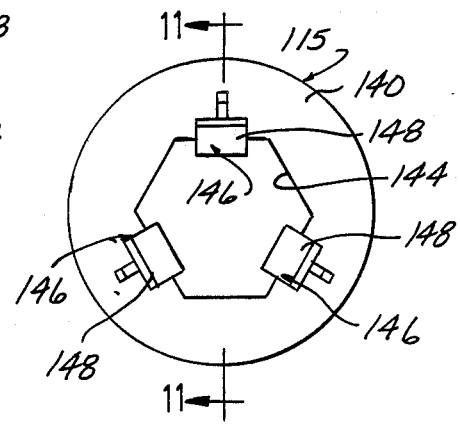
FIG. 10 is a left end view of the retainer of the cable length adjuster shown in FIG. 8.
Figure 11:
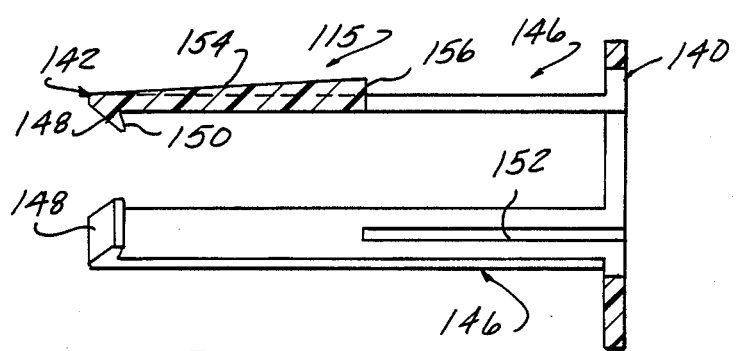
FIG. 11 is a cross sectional view of the retainer, generally taken along line 11—11 in FIG. 10.

As shown in FIGS. 8 and 9, the sleeve 114 is in the form of a hollow tubular member having a first end 130 and a second end 132. A bore 42 is formed adjacent the first end 130 and has a polygonal cross section formed of a plurality of circumferential, angularly disposed flat faces 44. The polygonal shape of the bore 42 is complementary to the polygonal shape of the boss 26 on the stud 112. Although the exterior surface of the sleeve 14 may have any shape, a hexagonal shape is illustrated in FIG. 9.

A shoulder 134 is formed intermediate the first and second ends 130 and 132 of the sleeve 114. The second end 132 of the sleeve 114 has an enlarged diameter, as shown in FIGS. 8 and 9. The peripheral surface 136 of the enlarged end portion 132 is provided with a suitable gripping surface, such as a knurled surface, to provide easy rotation of the sleeve 114.

A plurality of circumferentially-spaced, axially extending grooves, such as grooves 138, are formed in certain of the faces 44 of the bore 42 in the sleeve 114. The grooves 138 have a generally rectangular configuration opening into the hollow interior of the bore 42 and slidingly receive the retainer 115 as described hereafter.

The cable length adjuster 110 also includes means for retaining the stud 112 and the nut 116 in engagement after their initial assembly. In a preferred embodiment, the retaining means is in the form of the retainer 115 shown in FIGS. 8, 10 and 11. The retainer 115 is formed of an integral, single-piece body formed of molded or machined plastic. Other materials, such as steel, may also be employed to form the retainer 115. The retainer 115 has a first end 140 and a second end 142. The first end 140 has a generally planar configuration with a circular cross section, as clearly shown in FIGS. 10 and 11. An aperture 144 having a polygonal cross section formed of flat faces is formed in the planar first end portion 140. Preferably, the aperture 144 has a hexagonal cross section so as to enable the retainer 115 to be slidingly inserted over the nut 116 as described hereafter.

A plurality of resilient, axially-extending circumferentially-spaced prongs 146 are joined to the first end 140 of the retainer 115 and extend toward the second end 142. Preferably, three prongs 146 are formed on the retainer 115 and are equally circumferentially spaced at 120° about the circumference of the first end 140 of the retainer 115. An enlarged lock finger 148 is formed at the second end 142 of each of the prongs 146.

Each of the prongs 146 is in the form of a planar, generally rectangular strip. The lock finger 148 is formed at one end of the strip and has a face 150 facing the first end 140 of the retainer 115. An elongated slot 152 is formed in each prong 146 and extends from the first end 140 to an intermediate portion of each prong 146, as clearly shown in FIG. 11.

A rib denoted by reference number 154 is formed on one major surface of each prong 146. The rib 154 is generally perpendicular to the planar extent of the prong 146 and is centered along the axial length of each prong 146. The rib 152 tapers outwardly from the second end 142 of each prong 146 to an intermediate portion of the prong 146. An end edge 156 of each rib 154 at the intermediate portion of the prong 146 defines a face which engages the shoulder 134 in the sleeve 114 when the retainer 115 is slidably inserted into the sleeve 114, as described in greater detail hereafter.

As shown in FIG. 14, as the retainer 115 is slidably inserted into the sleeve 114, in the direction from the right as shown in the orientation of FIG. 14, the prongs 146 slide through the grooves 138 formed in the first end of the sleeve 114. During such insertion, the outwardly tapering surface of each rib 154 on each prong 146 causes each prong 146 to bend radially inward towards the axial center of the retainer 115 until the retainer 115 has been inserted sufficiently into the sleeve 14 such that the face 156 of the rib 154 snaps outwardly and engages the shoulder 134 formed in the intermediate portion of the sleeve 114 to retain the retainer 154 in a fixed position within the sleeve 114. In this position, as shown in FIG. 14, the first end 140 of the retainer 115 is in engagement with the first end 130 of the sleeve 114.

As shown in FIGS. 8, 12, 13 and 14, the nut 116 has a first end 150 and a second end 152. A hollow bore 154 is formed in the nut 116 extending inwardly from the first end 150. A plurality of internal threads 56 are formed in the nut 116 to threadingly engage the threads 36 formed on the stud 112. The external surface of the nut 116 is preferably formed with a polygonal cross section complimentary to the cross section of the bore 42 in the sleeve 114 to support the sleeve 114 for axial sliding movement.

Means are provided for attaching the cable 60 to the nut 116. The connecting means is identical to that described above and includes a bore which receives one end of the cable 60.

The second end 152 of the nut 116 has a larger diameter than the tubular portion surrounding the bore 154. The peripheral end 158 forms a seat for one end of a biasing means 68 inserted between the nut 158 and the shoulder 134 in the sleeve 114, as shown in FIG. 8. The biasing means 68 preferably comprises a coil spring which biases the sleeve 114 toward the stud 112 or to the right in the orientation shown in FIG. 8. This brings the first end of the sleeve 114 into engagement with the boss 26 on the stud 114 to prevent rotation of the sleeve 114 with respect to the stud 112, as described above.

A plurality of circumferentially-spaced slots 160 are formed in the second end 152 of the nut 116. Preferably, the slots 160 are equidistantly spaced 120° apart. A recess or cutout 162 is formed at the radially inner end of each slot 160.

The slots 160 slidingly receive the enlarged lock fingers 148 of the prongs 146 of the retainer 115 when the nut 116 is urged through the second end 142 of the retainer 115, as described hereafter and shown in FIG. 14. The lock fingers 148 of the prongs 146 lockingly engage the cutout or recess 162 in each slot 160 to retain the nut 116 within the retainer 115. Yet, the nut 116 is able to be axially moved; but is retained or captured between the prongs 146 of the retainer 115 so as to prevent complete unthreading disengagement of the nut 116 from the stud 112.

Referring now to FIG. 14, there is illustrated a partially assembled view of the sleeve 114, the retainer 115 and the nut 116. Initially, the retainer 115 is slidably inserted into the sleeve 114 from the right end, or first end 130 of the sleeve 114 as viewed in FIG. 14. The prongs 146 on the retainer 115 are aligned with the grooves 138 in the first end 130 of the sleeve 114 and slidingly urged therethrough. The tapered ribs 154 on each of the prongs 146 cause the second ends 142 of each prong 146 to bend inwardly due to the outwardly tapering surface of each rib 154 as the rib 154 traverses the axial length of the grooves 138 in the sleeve 114. As the sliding insertion of the retainer 115 is continued into the sleeve 114, the retainer 115 will reach the position shown in FIG. 14 where the face 156 of each rib 154 will snap into engagement with the intermediately disposed shoulder 134 in the sleeve 114 to lock the retainer 115 in position with respect to the sleeve 114. Also, at this time, the first end 140 of the retainer 115 engages the first end 130 of the sleeve 114.

The biasing means 68 may then be inserted between the ribs 154 of the prongs 146 of the retainer 115 and the inner surface of the sleeve 114. The intermediate shoulder 134 of the sleeve 114 acts as a seat for one end of the biasing means or coil spring 68.

The nut 116 is then urged into the retainer 115 from the left as viewed from FIG. 14. The slots 160 in the second end 154 of the nut 116 are aligned with the lock fingers 148 of the prongs 146 of the retainer 115. The nut 116 is inserted into the retainer 115 until it reaches the position shown in solid in FIG. 14 in which the lock fingers 148 of the retainer 115 have slid through the slots 160 and have engaged the cutouts or recesses 162 in each slot 160. This defines the limit of travel of the nut 116 to the left as shown by reference number 137 in FIG. 8 with respect to the retainer 115. Also, the biasing means or coil spring 68 is trapped between the second end 158 of the nut 116 and the intermediate shoulder 134 of the sleeve 114. This completes the preassembly of the sleeve 114, the retainer 115, and the nut 116 into an integral unit.

This assembly is then attached to the stud 112. The sleeve 114 is held in a fixed position. The stud 112 is inserted from the right through the first end 130 of the sleeve 114. The stud 112 is inserted until the lock fingers 120 and 122 snap over the edges of the planar end portion 140 of the retainer 115. This establishes the limit to the amount of travel of the stud 112 with respect to the retainer 115 as shown by reference number 161 in FIG. 8.

With the sleeve 114 retracted against the bias of the coil spring 68, the sleeve 114, the retainer 115 and the nut 116 are then rotated clockwise to engage the threads 56 in the nut 116 with the threads 36 on the stud 112. The nut 116 is threaded onto the stud 112 a predetermined distance as required for a particular application of the cable length adjuster 110. The sleeve 114 is then released and moves under the bias of the coil spring 68 into engagement with the boss 26 on the stud 112.

As shown by reference number 137 in FIG. 8, the nut 116 may be threaded to the left in the orientation viewed in FIG. 8 with respect to the stud 112 a distance depicted by the reference number 137. This distance is established by the amount of travel of the nut 116 before the lock figures 148 on the prongs 146 of the retainer 115 engage the recesses 162 in the second end of the nut 116.

The operation of the sleeve 114 to engage and disengage the stud 112 to permit clockwise or counterclockwise rotation and thus adjustment in the cable length adjuster 110 is identical to that described for the cable length adjuster 10 shown in FIGS. 1 and 2.

In summary, there has been disclosed a unique cable length adjuster with push and lock attachment means which enables a cable or other member to be adjusted in length and connected to a support member. The adjustment of the position of the cable is simply and easily implemented and permits a worker to use only one hand to adjust and lock the cable length adjuster. Further, the cable length adjuster of the present invention is particularly suited for those assembly operations where the connector, when in its mounting position, is hidden from view of the operator.

What is claimed is:

1. A cable length adjuster for attaching a cable to a support member comprising:
   a stud having first and second ends;
   means for attaching the first end of the stud to a support member;
   a sleeve having first and second ends;
   means, formed on the stud and the sleeve, for non-rotatably engaging the first end of the sleeve with the stud;
   a nut having first and second ends;
   the sleeve being slidably and non-rotatably mounted on the nut;
   means, disposed between the nut and the sleeve, for biasing the sleeve toward the first end of said stud;
   means extensibly connecting the nut to the stud to adjustably vary the overall length of the connected nut and stud;
   means for retaining the stud and the nut in engagement; and
   means for connecting the cable to the second end of the nut.

2. The cable length adjuster of claim 1 wherein the extensibly connecting means comprises:
   thread means, formed on the nut and the stud, for extensibly engaging the nut and the stud as the nut is rotated with respect to the stud.

3. The cable length adjuster of claim 2 wherein:
   a plurality of external threads are formed on the second end of the stud;
   a bore is formed in the first end of the nut; and
   a plurality of internal threads are formed in the bore in the nut engageable with the threads on the stud.

4. The cable length adjuster of claim 1 wherein the biasing means comprises:
   a coil spring.

5. The cable length adjuster of claim 4 further including:
   a flange formed on the second end of the nut acting as a seat for one end of the coil spring; and
   a notch formed intermediately along the sleeve acting as a seat for the opposed end of the coil spring.

6. The cable length adjuster of claim 4 wherein:
   the sleeve has an external surface extending completely from the first and second ends thereof to encompass the entire length of the coil spring.

7. The cable length adjuster of claim 1 further including:
   a bore formed in the first end of the sleeve, the bore having a cross section formed of a plurality of circumferential, angularly disposed flat faces.

8. The cable length adjuster of claim 7 wherein the flat faces are arranged in a polygonal shape.

9. The cable length adjuster of claim 8 wherein the polygonal shape is a hexagon.

10. The cable length adjuster of claim 7 wherein the means for non-rotatingly engaging the first end of the sleeve with the stud comprises:
    the flat faces of the bore in the first end of the sleeve; and a boss formed on the stud and having a peripheral surface formed with circumferential, angularly disposed flat faces slidably receiving the flat faces of the bore in the first end of the sleeve in non-rotatable, locking engagement when the sleeve is biased toward the stud by the biasing means.

11. The cable length adjuster of claim 7 wherein:
the first end of the nut has an external cross section formed of a plurality of circumferential, angularly disposed, flat faces complimentary to the cross section of the bore in the first end of the sleeve for sliding, non-rotatable engagement of the sleeve with respect to the nut.

12. The cable length adjuster of claim 1 wherein the means for connecting the cable to the second end of the nut comprises:
the cable having an enlarged diameter ball at one end; and
a bore formed in the second end of the nut having a cross section smaller than the diameter of the ball for receiving the cable therethrough and disposing the ball in the nut.

13. The cable length adjuster of claim 1 wherein the means for attaching the first end of the stud to the support member further comprises:
a projection on the stud having a circular cross section.

14. The cable length adjuster of claim 1 wherein the retaining means comprises:
a retainer mounted to the sleeve and having first and second ends, the first end having a planar shape;
a plurality of resilient, axially extending, circumferentially-spaced prongs joined to the first end and extending to the second end of the retainer; and
an enlarged lock finger formed on the end of each of the prongs and lockingly engaging the second end of the nut, after the nut is inserted into the retainer, to limit the travel of the nut in a first direction with respect to the retainer.

15. The cable length adjuster of claim 14 wherein the prongs comprise three-equi-circumferentially-spaced prongs.

16. The cable length adjuster of claim 14 further including:
a plurality of axially extending, circumferentially-spaced grooves formed in the sleeve to slidingly receive the prongs of the retainer.

17. The cable length adjuster of claim 14 wherein:
an internal shoulder is formed intermediate the first and second ends of the sleeve;
an outwardly inclined rib is formed on each prong of the retainer extending from the second end of the retainer outward to an intermediate portion of the retainer, each rib terminating in a face engageable with the shoulder in the sleeve to connect the retainer to the sleeve in a snap fit; and
the first end of the retainer engages the first end of the sleeve when the face of the rib of each prong engages the shoulder in the sleeve.

18. The cable length adjuster of claim 14 wherein:
a plurality of circumferentially-spaced slots formed in the second end of the nut; and
a recess formed at the inner end of each slot;
the lock fingers of each prong of the retainer sliding through the slots in the nut and engaging the recess in each slot to limit travel of the nut in a first direction with respect to the retainer.

19. The cable length adjuster of claim 14 further including:
a plurality of lock fingers formed on the first end of the stud, the lock fingers surrounding the planar first end of the retainer to limit travel of the first end of the retainer in one direction with respect to the stud.

20. A cable length adjuster for attaching a cable to a support member comprising:
a stud having first and second ends;
a boss formed on the stud having an exterior surface formed of circumferential, angularly disposed, flat faces;
external threads formed on the stud extending from the second end of the stud;
a sleeve having first and second ends;
a bore formed in the first end of the sleeve and having a cross section formed of a plurality of circumferential, angularly disposed, flat faces complimentary to the peripheral surface of the boss of the stud for axial sliding engagement of the first end of the sleeve with the stud;
a shoulder formed in the bore of the sleeve intermediate the first and second ends of the sleeve;
a nut having first and second ends;
biasing means, disposed between the nut and the sleeve, for biasing the sleeve toward the stud such that the first end of the sleeve engages the boss on the stud;
the nut having an external surface formed of a plurality of circumferential, angularly disposed, flat faces slidably and non-rotatably supporting the flat faces formed in the bore in the sleeve;
a bore formed in the first end of the nut;
a plurality of internal threads formed in the bore in the nut engageable with the external threads on the stud for extensibly connecting the nut to the stud to adjustably vary the overall length of the connected nut and stud upon rotation of the sleeve and nut with respect to the stud;
a retainer having first and second ends, the first end having a planar shape;
a plurality of resilient, axially extending, circumferentially-spaced prongs joined to the first end and extending to the second end of the retainer;
an enlarged lock finger formed at the second end of each prong;
an outwardly inclined rib formed on each prong of the retainer extending from the second end of the retainer to an intermediate portion of the retainer and terminating in a face engagable with the intermediate shoulder in the sleeve to connect the retainer to the sleeve in a snap fit;
a plurality of circumferentially-spaced grooves formed in the bore of the sleeve and extending from the first end of the sleeve to the shoulder formed at an intermediate portion of the sleeves, the grooves slidingly receiving the prongs of the retainer as the retainer is slidingly inserted into the sleeve into the face of each rib engages the shoulder in a snap fit, the first end of the retainer engaging the first end of the sleeve when the face of the prong of the retainer engages the shoulder in the sleeve;
a plurality of circumferentially-spaced slots formed in the second end of the nut;
a recess formed at one end of each slot;

the fingers of each prong of the retainer sliding through the slot in the nut and engaging the recess in each slot to limit the travel of the nut in a first direction with respect to the retainer;

a plurality of lock fingers formed on the first end of the stud, the lock fingers surrounding the planar first end of the retainer to limit travel of the first end of the retainer in one direction with respect to the stud; and means for connecting the cable to the second end of the nut.

* * * * *